United States Patent
Lee et al.

(10) Patent No.: US 11,917,555 B2
(45) Date of Patent: Feb. 27, 2024

(54) POWER ALLOCATION METHOD OF TERMINAL HAVING MULTIPLE CARRIERS CONFIGURED, AND TERMINAL USING SAME

(71) Applicant: LG ELECTRONICS INC., Seoul (KR)

(72) Inventors: Seungmin Lee, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 1191 days.

(21) Appl. No.: 16/497,426

(22) PCT Filed: Mar. 26, 2018

(86) PCT No.: PCT/KR2018/003552
§ 371 (c)(1),
(2) Date: Sep. 24, 2019

(87) PCT Pub. No.: WO2018/174688
PCT Pub. Date: Sep. 27, 2018

(65) Prior Publication Data
US 2023/0076122 A1    Mar. 9, 2023

Related U.S. Application Data

(60) Provisional application No. 62/476,711, filed on Mar. 24, 2017.

(51) Int. Cl.
*H04W 52/38*    (2009.01)
*H04W 52/34*    (2009.01)
*H04W 72/20*    (2023.01)

(52) U.S. Cl.
CPC ....... *H04W 52/346* (2013.01); *H04W 52/383* (2013.01); *H04W 72/20* (2023.01)

(58) Field of Classification Search
CPC .. H04W 52/346; H04W 72/20; H04W 52/383
See application file for complete search history.

(56) References Cited

U.S. PATENT DOCUMENTS 8,331,307 B2 * 12/2012 Bui ...................... H04L 5/0007
                                                           370/204
9,955,431 B2 *  4/2018 Narasimha ............. H04L 5/001
(Continued)

FOREIGN PATENT DOCUMENTS

CN        102771173      11/2012
JP         2018511984      4/2018
(Continued)

OTHER PUBLICATIONS

Japan Patent Office Application No. 2019-552626, Notice of Allowance dated Sep. 14, 2021, 3 pages.
(Continued)

*Primary Examiner* — Hai V Nguyen
(74) *Attorney, Agent, or Firm* — LEE, HONG, DEGERMAN, KANG & WAIMEY

(57) ABSTRACT

Provided are a power allocation method of a terminal having multiple carriers configured, and the terminal using same. The method comprises: determining a representative transmission time interval (TTI) of a first carrier; determining a representative TTI of a second carrier; and on the basis of the length of the representative TTI of the first carrier and the length of the representative TTI of the second carrier, allocating first transmit power to the first carrier, and then allocating second transmit power to the second carrier.

9 Claims, 11 Drawing Sheets

(56) References Cited

U.S. PATENT DOCUMENTS

| | | | | |
|---|---|---|---|---|
| 10,616,842 B2* | 4/2020 | Lee | | H04W 92/18 |
| 10,667,241 B2* | 5/2020 | Sebire | | H04W 72/21 |
| 10,791,549 B2* | 9/2020 | Shimezawa | | H04L 5/0094 |
| 10,798,664 B2* | 10/2020 | Lee | | H04L 5/0053 |
| 2009/0010214 A1* | 1/2009 | Bui | | H04L 5/0007 |
| | | | | 370/329 |
| 2012/0057547 A1* | 3/2012 | Lohr | | H04L 5/0039 |
| | | | | 370/329 |
| 2013/0034062 A1* | 2/2013 | Seo | | H04L 45/245 |
| | | | | 370/329 |
| 2016/0156422 A1* | 6/2016 | Lindoff | | H04B 15/00 |
| | | | | 370/252 |
| 2016/0205631 A1* | 7/2016 | Chen | | H04W 52/146 |
| | | | | 455/522 |
| 2016/0255594 A1* | 9/2016 | Vajapeyam | | H04W 52/346 |
| | | | | 455/522 |
| 2016/0323887 A1* | 11/2016 | Patel | | H04W 52/367 |
| 2018/0049206 A1* | 2/2018 | Yerramalli | | H04W 16/14 |
| 2018/0249476 A1* | 8/2018 | Miao | | H04W 72/0446 |
| 2018/0263026 A1* | 9/2018 | Loehr | | H04W 72/20 |
| 2019/0045390 A1* | 2/2019 | Davydov | | H04W 28/0289 |
| 2019/0045465 A1* | 2/2019 | Lee | | H04W 92/18 |
| 2019/0053242 A1* | 2/2019 | Akula | | H04L 5/001 |
| 2019/0053267 A1* | 2/2019 | Kim | | H04W 76/14 |
| 2019/0182806 A1* | 6/2019 | Chae | | H04W 72/51 |
| 2019/0199571 A1* | 6/2019 | John Wilson | | H04L 27/2657 |
| 2019/0268931 A1* | 8/2019 | He | | H04W 76/28 |
| 2019/0268971 A1* | 8/2019 | Talarico | | H04W 76/27 |
| 2019/0320447 A1* | 10/2019 | Blasco Serrano | | H04W 76/14 |
| 2019/0394786 A1* | 12/2019 | Parron | | H04L 5/0032 |
| 2020/0022175 A1* | 1/2020 | Xiong | | H04L 5/001 |
| 2020/0275458 A1* | 8/2020 | Khoryaev | | H04W 72/02 |
| 2021/0058833 A1* | 2/2021 | Basu Mallick | | H04W 76/19 |
| 2021/0297829 A1* | 9/2021 | Kwak | | H04W 72/0446 |
| 2021/0298022 A1* | 9/2021 | Parkvall | | H04B 7/06 |
| 2021/0352647 A1* | 11/2021 | Loehr | | H04W 72/20 |
| 2021/0377108 A1* | 12/2021 | Cho | | H04W 72/0453 |
| 2022/0086607 A1* | 3/2022 | Ali | | H04W 4/40 |
| 2022/0132524 A1* | 4/2022 | Mueck | | H04W 4/80 |
| 2022/0159628 A1* | 5/2022 | Bangolae | | H04W 72/04 |
| 2022/0190983 A1* | 6/2022 | Zhao | | H04W 76/14 |
| 2022/0191733 A1* | 6/2022 | Ali | | H04W 4/46 |
| 2022/0224457 A1* | 7/2022 | Ebrahim Rezagah | | H04L 1/08 |
| 2022/0248430 A1* | 8/2022 | Ly | | H04L 5/0094 |
| 2023/0224880 A1* | 7/2023 | Xiong | | H04W 72/0453 |
| | | | | 370/329 |

FOREIGN PATENT DOCUMENTS

| | | |
|---|---|---|
| WO | 2016137816 | 9/2016 |
| WO | 2016143968 | 9/2016 |
| WO | 2017033490 | 3/2017 |

OTHER PUBLICATIONS

LG Electronics, "Discussion on eMBB and URLLC multiplexing for uplink," R1-1707665, 3GPP TSG RAN WG1 Meeting #89, May 2017, 3 pages.

European Patent Office Application Serial No. 18771009.0, Search Report dated Feb. 13, 2020, 9 pages.

Samsung, "Aggregation of NR Carriers", 3GPP TSG RAN WG1 Meeting #86, R1-166806, Aug. 2016, 3 pages.

Japan Patent Office Application No. 2019-552626, Office Action dated Dec. 22, 2020, 4 pages.

Samsung, "Remaining details on congestion control," 3GPP TSG RAN WG1 #88, R1-1702866, Feb. 2017, 5 pages.

Ericsson, "sPUSCH power control and PHR report for sTTI," 3GPP TSG-RAN WG1 Meeting #88, R1-1703271, Feb. 2017, 4 pages.

LG Electronics, "Discussion on and handling Short TTI in PC5 operation," 3GPP TSG RAN WG1 Meeting #89, R1-1707565, May 2017, 5 pages.

PCT International Application No. PCT/KR2018/003552, International Search Report dated Jun. 26, 2018, 4 pages.

Huawei, HiSilicon, "UL power control for short TTI," 3GPP TSG-RAN WG1 Meeting #88, R1-1701738, Feb. 2017, 6 pages.

ITRI, "Power headroom reporting issue for sTTI operation," 3GPP TSG-RAN WG1 Meeting #88, R1-1702386, Feb. 2017, 4 pages.

The State Intellectual Property Office of the People's Republic of China Application Serial No. 201880020818.6, Office Action dated Sep. 5, 2022, 10 pages.

* cited by examiner

POWER ALLOCATION METHOD OF TERMINAL HAVING MULTIPLE CARRIERS CONFIGURED, AND TERMINAL USING SAME

CROSS-REFERENCE TO RELATED APPLICATIONS

This application is the National Stage filing under 35 U.S.C. 371 of International Application No. PCT/KR2018/003552, filed on Mar. 26, 2018, which claims the benefit of U.S. Provisional Application No. 62/476,711, filed on Mar. 24, 2017, the contents of which are all hereby incorporated by reference herein in their entirety.

BACKGROUND OF THE DISCLOSURE

Field of the Disclosure

The present disclosure relates to wireless communication and, more particularly, to a power allocation method of a terminal having multiple carriers configured and the terminal using the same.

Related Art

Recently, interest in D2D (Device-to-Device) technology for direct communication between devices is being increased. In particular, D2D is drawing attention as a communication technology for a public safety network. Public safety networks have higher service requirements (reliability and security) than commercial communication networks, and also require direct signal transmission, or D2D operation, between devices, even when it is not covered by the coverage of cellular communications or it is not available for the cellular communications.

D2D operation may have various advantages in that it transmits and receives signals between adjacent devices. For example, the D2D user equipment has a high data rate and low latency and can perform data communication. In addition, the D2D operation may distribute traffic congested at the base station, and may also serve to extend the coverage of the base station when the D2D terminal serves as a relay.

Meanwhile, in LTE-A (long term evolution-advanced), an interface used for D2D operation, that is, an interface between a terminal and a terminal is called a sidelink, and the sidelink may also be used in communications between terminals installed in vehicles, or communications, i.e., vehicle-to-everything (V2X) between the terminal installed in vehicles and another terminal.

In the existing V2X communication, it is assumed that mainly one carrier is used, but in the future wireless communication system, it is possible to support the use of multiple carriers for V2X communication.

Meanwhile, the sidelink communication may transmit control signals, data, and the like while maintaining a transmission time interval (TTI) in an existing system, or may transmit control signals, data, and the like, using a shorter TTI than the existing system. Or, for example, one of the control signals and data may be transmitted using an existing TTI and the other thereof may be transmitted using the short TTI. Or, control signals may be transmitted using one TTI among various TTIs shorter than the existing TTI, and data may be transmitted using any other TTI among them. In relation to V2X communication, the various signal transmission schemes may be independently configured for each carrier.

This operation is a new operation that has not existed previously, and thus, it may be an issue on in which scheme of allocating transmission power for each carrier.

SUMMARY OF THE DISCLOSURE

The present disclosure has been made in an effort to provide a power allocation method of a terminal having multiple carriers configured and a terminal using the method.

In one aspect, provided is a power allocation method of a terminal having multiple carriers configured. The method includes determining a representative transmission time interval (TTI) of a first carrier, determining a representative TTI of a second carrier and on the basis of the length of the representative TTI of the first carrier and the length of the representative TTI of the second carrier, allocating first transmit power to the first carrier, and then allocating second transmit power to the second carrier.

The length of the representative TTI of the first carrier may be shorter than the representative TTI of the second carrier.

The first transmit power may be a greater value than the second transmit power.

When the number of symbols to which a physical sidelink control channel (PSCCH) is transmitted is n (n is a natural number) and the number of symbols to which a physical sidelink shared channel (PSSCH) is transmitted is m (m is a natural number) on the first carrier, the length of the representative TTI of the first carrier may be determined as the maximum value among n and m.

When the number of symbols to which a physical sidelink control channel (PSCCH) is transmitted is n (n is a natural number) and the number of symbols to which a physical sidelink shared channel (PSSCH) is transmitted is m (m is a natural number) on the first carrier, the length of the representative TTI of the first carrier may be determined as the minimum value among n and m.

The first transmit power and the second transmit power may be allocated on the basis of the length of the representative TTI of the first carrier, the length of the representative TTI of the second carrier, priority per packet and channel busy ratio (CBR) of signals transmitted on the first carrier and the second carrier, respectively When the number of symbols to which a physical sidelink control channel (PSCCH) is transmitted is n (n is a natural number), the number of symbols to which a physical sidelink shared channel (PSSCH) is transmitted may be m (m is a natural number) on the first carrier and m is greater than n, the PSSCH is transmitted at a constant transmit power in the m symbols.

The PSCCH and the PSSCH may be frequency division multiplexed (FDM).

When the number of symbols to which a physical sidelink control channel (PSCCH) is transmitted is n (n is a natural number), the number of symbols to which a physical sidelink shared channel (PSSCH) is transmitted is m (m is a natural number) on the first carrier and m is greater than n, the transmit power of the PSSCH transmitted in the n symbols and the transmit power of the PSSCH transmitted in the m-n symbols may be different from each other.

Information indicating a difference or ratio between the transmission power of the PSSCH transmitted in the n symbols and the transmission power of the PSSCH transmitted in the m-n symbols on the PSCCH may be received.

The first carrier and the second carrier may be included in the multiple carriers.

In another aspect, provided is a terminal. The terminal includes a transceiver configured to transmit and receive radio signal and a processor operably coupled to the transceiver. The processor is configured to: determine a representative transmission time interval (TTI) of a first carrier, determine a representative TTI of a second carrier and on the basis of the length of the representative TTI of the first carrier and the length of the representative TTI of the second carrier, allocate first transmit power to the first carrier, and then allocate second transmit power to the second carrier.

According to the present disclosure, a representative TTI for each carrier is determined, and transmission power for each carrier is allocated on the basis of the representative TTI value of each carrier. Since the transmission power for each carrier is determined in consideration of the TTI for each carrier, reliability of signal transmission can be improved. For example, when higher transmission power is allocated to a carrier using a short TTI, transmission reliability of a signal transmitted on the carrier can be increased. In addition, though various TTIs are used for any carrier, transmission power is allocated on the basis of a representative TTI, thereby reducing complexity.

DESCRIPTION OF EXEMPLARY EMBODIMENTS

Figure 1:
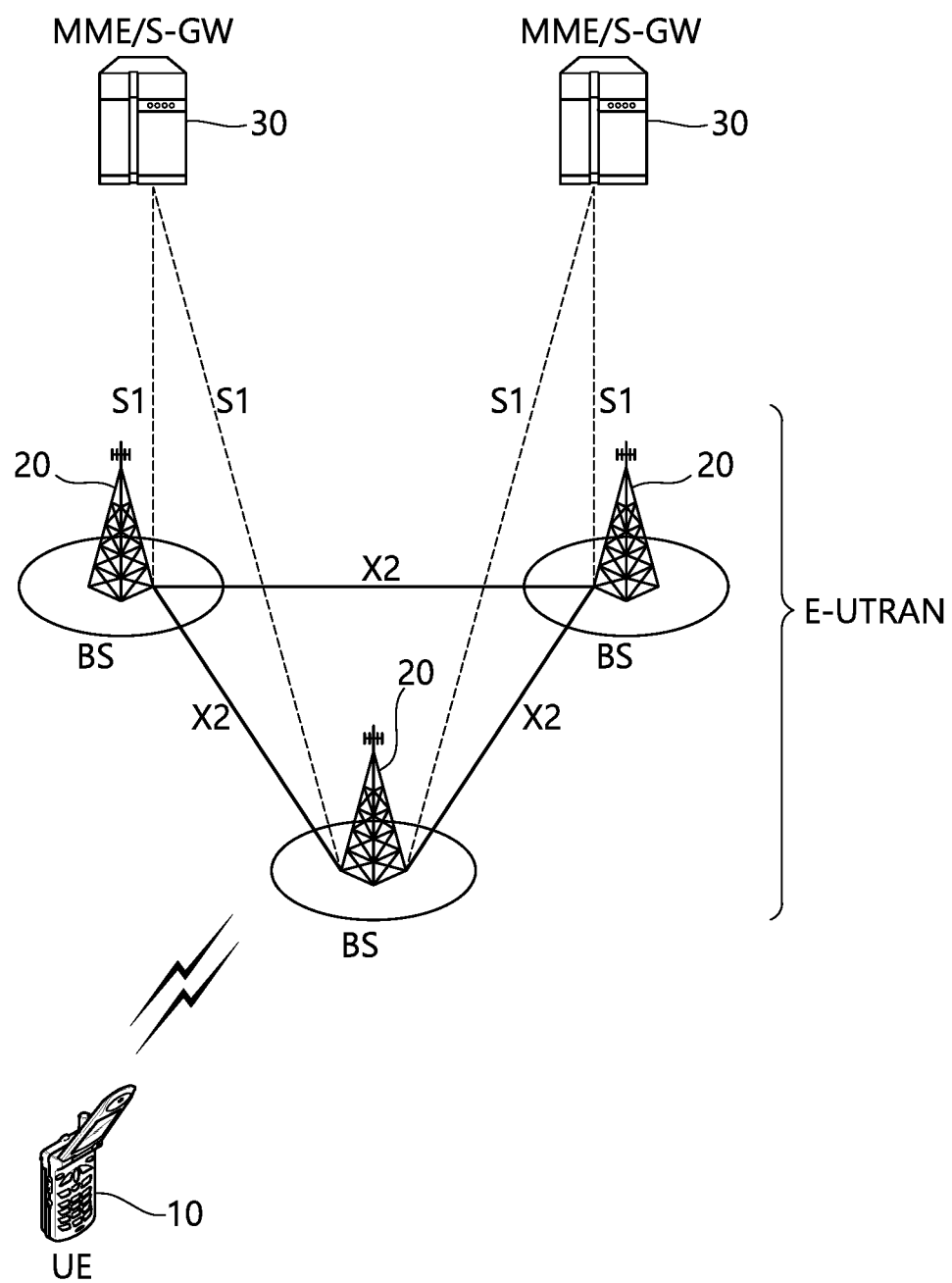
FIG. 1 illustrates a wireless communication system.

FIG. 1 shows a wireless communication system.

The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

The wireless communication system may be a time division duplex (TDD) system, a frequency division duplex (FDD) system, or a system in which TDD and FDD are used together.

Figure 2:
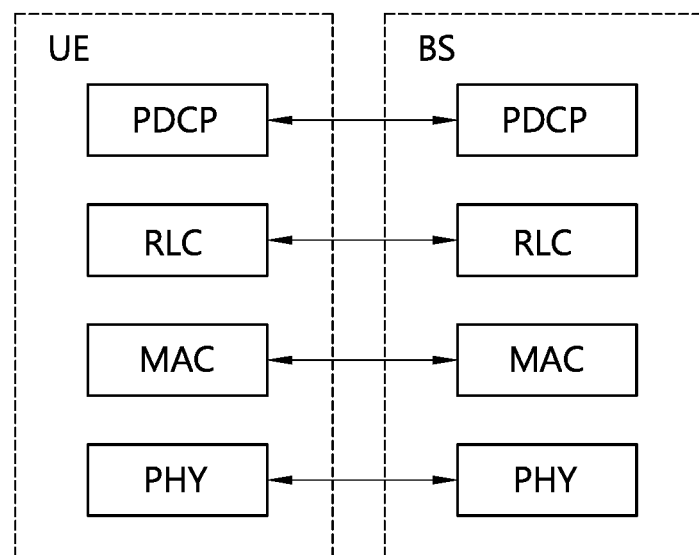
FIG. 2 is a block diagram showing the structure of a radio protocol on the user plane.
Figure 3:
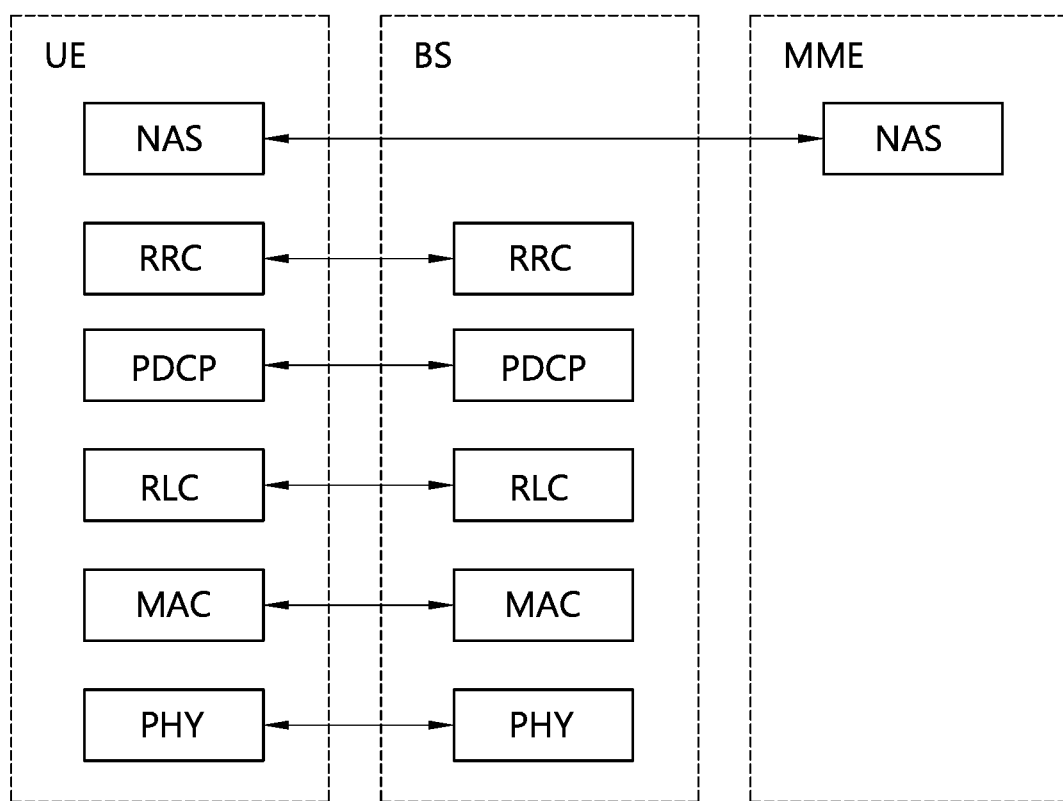
FIG. 3 is a block diagram showing the structure of a radio protocol on the control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

The RRC state refers to whether or not the RRC layer of the UE is in a logical connection with the RRC layer of the E-UTRAN, and when it is connected, it is called an RRC connected state (RRC_CONNECTED) and when it is not connected, it is called an RRC idle state (RRC_IDLE). Since the UE in the RRC connected state has an RRC connection, the E-UTRAN can identify the existence of the corresponding UE in a cell unit, and thus can effectively control the UE. On the other hand, the UE of the RRC idle state cannot be identified by the E-UTRAN, and is managed by the CN (core network) in units of a tracking area, which is a larger area than a cell. That is, whether or not the UE is in the RRC idle state is identified only in a large area unit, and should move to the RRC connected state in order to receive a normal mobile communication service such as voice or data.

When a user initially powers on the UE, the UE first searches for an appropriate cell and then stays in an RRC idle state in the cell. When the UE in the RRC idle state needs to establish an RRC connection, it establishes an RRC connection with the E-UTRAN through an RRC connection procedure and transitions to the RRC connected state. There are several cases in which the UE in RRC idle state needs to establish an RRC connection. For example, the cases may be that an uplink data transmission is necessary due to a user's call attempt or the like, or when a paging message from E-UTRAN is received, a response message or the like is transmitted in response to the paging message.

The non-access stratum (NAS) layer located in the upper layer of the RRC layer performs functions such as session management, mobility management and the like.

In order to manage mobility of the UE in the NAS layer, two states of EMM-REGISTERED (EPS Mobility Management-REGISTERED) and EMM-DEREGISTERED are defined, and these two states are applied to the UE and the MME. The initial UE is in the EMM-DEREGISTERED state, and the UE performs a process of registering with the corresponding network through an initial attach procedure to access the network. When the attach procedure is successfully performed, the UE and the MME are in the EMM-REGISTERED state.

In order to manage a signaling connection between the UE and the EPC, two states are defined, an EPS Connection Management (ECM)-IDLE state and an ECM-CONNECTED state, and these two states are applied to the UE and the MME. When the UE in the ECM-IDLE state establishes an RRC connection with the E-UTRAN, the UE is in the ECM-CONNECTED state. The MME in the ECM-IDLE state becomes the ECM-CONNECTED state when it establishes an S1 connection with the E-UTRAN. When the UE is in the ECM-IDLE state, the E-UTRAN does not have context information of the UE. Accordingly, the UE in the ECM-IDLE state performs a UE-based mobility related procedure such as cell selection or cell reselection without receiving a command from the network. On the other hand, when the UE is in the ECM-CONNECTED state, the mobility of the UE is managed by the command of the network. In the ECM-IDLE state, when the position of the terminal is different from the position known by the network, the UE informs the network of the corresponding position of the UE through a tracking area update procedure.

The D2D operation will be now described. In 3GPP LTE-A, a service related to D2D operation is called proximity based services (ProSe). Hereinafter, ProSe is an equivalent concept to D2D operation, and ProSe may be used by being mixed with D2D operation. Now, the ProSe will be now described.

The ProSe has ProSe communication and ProSe direct discovery. The ProSe direct communication refers to communication performed between two or more neighboring UEs. The UEs may perform communication using a user plane protocol. The ProSe-enabled UE refers to the UE that supports a procedure related to the requirements of ProSe. Unless otherwise stated, the ProSe-enabled UE include both a public safety UE and a non-public safety UE. The public safety UE is a terminal that supports both a public safety-specific function and a ProSe process. The non-public safety UE is the UE that supports a ProSe process but does not support the public safety-specific function.

The ProSe direct discovery is a process for the ProSe-enabled UE to discover other ProSe-enabled UE that are adjacent to each other, using only the capabilities of the two ProSe-enabled UEs. EPC-level ProSe discovery refers to a process in which an EPC determines whether two ProSe-enabled UEs are in proximity and informs the two ProSe-enabled UEs of their proximity.

Hereinafter, for convenience, the ProSe direct communication may be referred to as D2D communication and the ProSe direct discovery may be referred to as D2D discovery. The link used for D2D operation is called sidelink in LTE.

The V2X (vehicle to everything) communication will be now described. The V2X means communication between a UE installed in a vehicle and another UE, and the other UE may be a pedestrian, a vehicle, or an infrastructure, and in this case, it may be referred to as a vehicle to pedestrian (V2P), a vehicle to vehicle (V2V), a vehicle to infrastructure (V2I) and the like.

In the V2X communication, data/control information may be transmitted and received through a sidelink defined in a D2D operation other than an uplink/downlink link between a base station and a UE used in the existing LTE communication.

The following physical channels may be defined in the sidelink.

Physical Sidelink Broadcast Channel (PSBCH) is a physical sidelink broadcast channel. Physical Sidelink Control Channel (PSCCH) is a physical sidelink control channel. Physical Sidelink Discovery Channel (PSDS) is a physical sidelink discovery channel. Physical Sidelink Shared Channel (PSSCH) is a physical sidelink shared channel. Sidelink Synchronization Signal (SLSS) is a sidelink synchronization signal. The SLSS may include a Primary Sidelink Synchronization Signal (PSSS) and a Secondary Sidelink Synchronization Signal (SSSS). The SLSS and the PSBCH may be transmitted together.

The sidelink may mean an interface between the terminal and the terminal, and the sidelink may correspond to the PC5 interface.

Figure 4:
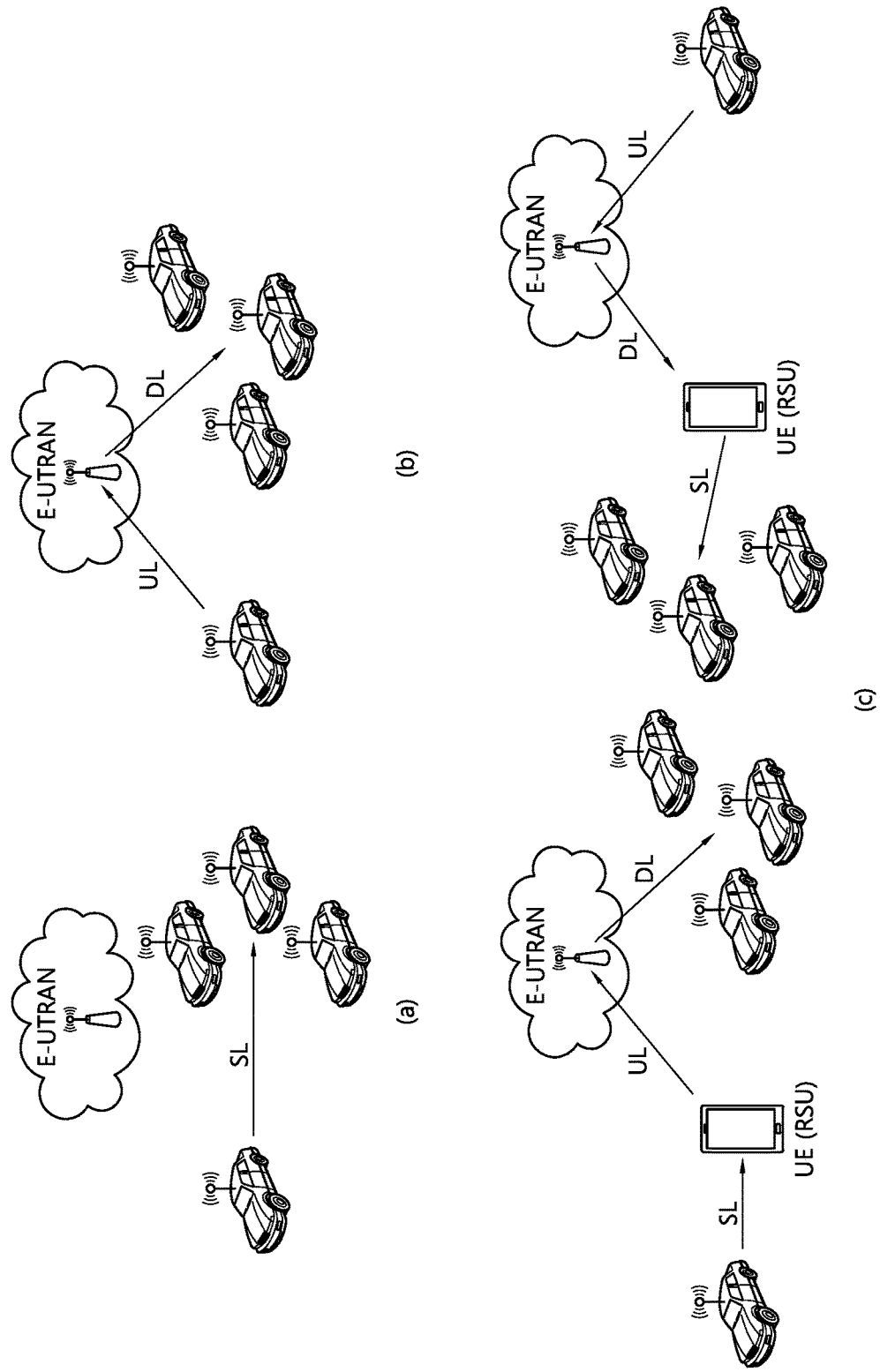
FIG. 4 illustrates scenarios for V2X communication.

FIG. 4 illustrates scenarios for V2X communication.

Referring to FIG. 4(a), V2X communication may support PC5-based information exchange operation (between UEs), which is an interface between the UEs, and it may also support Uu-based elaboration exchange operation (between UEs) corresponding to an interface between the base station (eNodeB) and the terminal (UE), as shown in FIG. 4(b). In addition, as shown in FIG. 4C, both PC5 and Uu may be used to support information exchange operations (between UEs).

Hereinafter, the present disclosure will be described on the basis of the 3GPP LTE/LTE-A system for convenience of description. However, the scope of the system to which the present disclosure is applied can be extended to other systems besides the 3GPP LTE/LTE-A system.

The present disclosure will now be described.

The proposed schemes below proposes methods for efficiently operating transmission power control when V2X communication on the basis of a relatively short transmission time interval (TRANSMISSION TIME INTERVAL) is performed compared to the existing interval (for example, "1 ms (milliseconds)"). Hereinafter, for convenience, a transmission time interval shorter than the existing 1 ms is called an S-TTI, and an existing transmission time interval of 1 ms is called an L-TTI.

In the future wireless communication systems, a variable TTI (channel/signal) may be introduced in consideration of traffic (or data) such as various transmission coverage/reliability/latency requirements. As an example, after a basic resource unit (BASIC RESOURCE UNIT) is defined (/configured), the TTI (for transmission of data related channel/signal of a specific requirement) may be defined as a singular or a combination of multiple basic resource units. For example, when an S-TTI is defined as a pre-configured (/signaled) base resource unit, the L-TTI may be interpreted in the form of is a combination of (a pre-configured (/signaled)) K S-TTIs. As another example, when the L-TTI is defined as a pre-configured (/signaled) base resource unit, the S-TTI may be interpreted as a form (e.g., a sort of MINI-BASIC RESOURCE UNIT) in which the L-TTI (Basic Resource Unit) is partitioned into (pre-configured (/signaled)) K units. As another example, the S-TTI may also have a form in which multiple (pre-configured (/signaled) basic resource units are combined.

The V2X communication mode may be typically classified into a mode (A) (it is referred to as mode #3) in which a base station signals (/controls) scheduling information related to V2X message transmission (/reception) on a V2X resource pool pre-configured(/signaled) from a base station (/network) and a mode (B) (it is referred to as mode #4) in which a UE independently determines (/controls) V2X message transmission (/reception) related scheduling information on a V2X resource pool pre-configured(/signaled) from a base station (/network).

The mode #3 may be, for example, subject to a UE located within the communication coverage by a base station, and/or a UE in an RRC_connected state. The mode #4 may be, for example, subject to a UE located within/out of the communication coverage by a base station, and/or a UE in the RRC_connection/RRC_idle state.

Hereinafter, in the present disclosure, the "sensing operation" may be interpreted as a PSSCH-RSRP measurement operation on the basis of a PSSCH DM-RS sequence scheduled by a successfully decoded PSCCH and/or an S-RSSI measurement operation on the basis of a V2X resource pool related sub-channel, etc.

In the present disclosure, "receiving" may be interpreted as being extended to at least one of (A) V2X channel (/signal) (e.g., PSCCH, PSSCH, PSBCH, PSSS/SSSS, etc.) decoding(/receiving) operation, WAN DL channel (/signal) (e.g., For example, PDCCH, PDSCH, PSS/SSS, etc.) decoding (/receiving) operation decoding, (B) sensing operation, and (C) CBR measurement operation.

In the present disclosure, "transmitting" may be interpreted as being extended to at least one of a V2X channel (/signal) (e.g., PSCCH, PSSCH, PSBCH, PSSS/SSSS, etc.) transmission operation, WAN UL channel (/signal) (e.g., PUSCH, PUCCH, SRS, etc.) transmission operation.

In the present disclosure, a "carrier" may be interpreted as being extended to at least one of (A) pre-configured (/signalled) carrier set (/group), (B) V2X resource pool.

In the following description, it is assumed the situation that the PSCCH and the PSSCH associated therewith is transmitted in the form of "frequency division multiplexing" (FDM). However, this is not a limitation, and it is obvious that the present disclosure may be extended and applied even in a situation in which the PSCCH and the PSSCH associated therewith is transmitted in the form of "time division multiplexing" (TDM) or a combination of FDM and TDM.

Sidelink Received Signal Strength Indicator (S-RSSI), Sidelink Reference Signal Received Power (S-RSRP), Channel busy ratio (CBR) and Channel occupancy ratio (CR) will be described.

First, S-RSSI is a received signal strength indicator in the sidelink. The S-RSSI may be defined as a linear average of the total received power for each SC-FDMA symbol, measured by the UE in the configured sub-channel, in SC- FDMA symbols #1, 2, . . . , 6 of the first slot and SC-FDMA symbols #0, 1, . . . , 5 of the second slot of the subframe.

The S-RSRP means the reference signal reception power in the sidelink. For example, the S-RSRP may include a PSSCH-RSRP obtained by calculating an RSRP from a PSSCH. The PSSCH-RSRP may be defined as a linear average of the power contributions of resource elements (REs) carrying a demodulation reference signal (DM-RS) associated with the PSSCH, within the physical resource blocks (PRBs) indicated by the associated PSCCH.

The CBR indicates the busy ratio of the channel, and the CBR measured in subframe n may be defined as follows.

In the case of the PSSCH, it is sensed in the subframe [n−100, n−1] and represents the ratio in the resource pool of the sub-channel having the S-RSSI measured as exceeding a predetermined or configured threshold.

In case of PSCCH, it is sensed in subframe [n−100, n−1], and, in a pool configured to transmit PSCCH together with corresponding PSSCH in non-contiguous resource blocks, indicates the ratio of resources of the PSCCH pool with S-RSSI measured as being above a predetermined or configured threshold. Here, it is assumed that the PSCCH pool is composed of resources of two consecutive PRB pairs in the frequency domain.

The CR means channel occupancy. The CR calculated in subframe n may be defined as a value of the total sum of the number of sub-channels used for its transmission in subframe [n−a, n−1] and the number of sub-channels allowed for its transmission in subframe [n, n+b] divided by total number of sub-channels configured in the transmission pool over subframes [n−a, n+b].

Here, the 'a' is a positive integer and 'b' is 0 or a positive integer. The 'a, b' is determined by the UE, has a relationship of a+b+1=1000, 'a' is 500 or more, n+b should not exceed the most recent transmission opportunity of the grant for the current transmission. The CR may be evaluated for every (re-)transmission. The CR may be calculated for each priority level.

Hereinafter, S-PSCCH_L means the number of symbols constituting the S-TTI-based PSCCH, S-PSSCH_L means the number of symbols constituting the S-TTI-based PSSCH.

And, hereinafter, S-PSCCH means S-TTI based PSCCH, S-PSSCH means S-TTI based PSSCH.

Hereinafter, it is assumed that the (S-)PSSCH associated with the (S-)PSCCH is transmitted in the form of "FDM".

Figure 5:
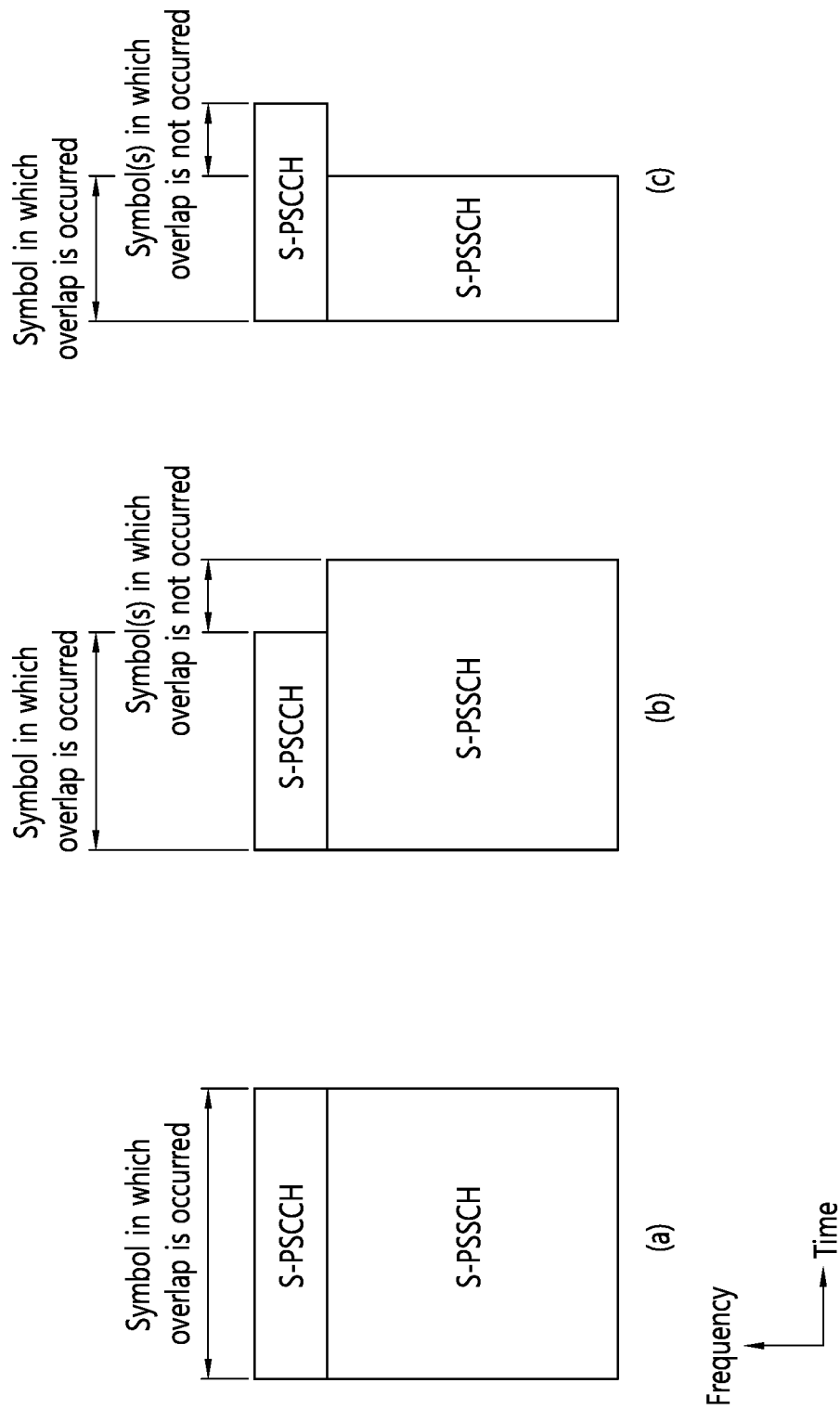
FIG. 5 shows an example of transmission of a PSCCH and a PSSCH.

FIG. 5 shows an example of transmission of a PSCCH and a PSSCH.

Referring to FIG. 5, the PSCCH and the PSSCH scheduled by the PSCCH, that is, the associated PSSCHs may be transmitted through different frequencies (FDM).

In FIG. 5(a), it is S-PSCCH_L=S-PSSCH_L. That is, in the time domain, the number of symbols constituting the S-TTI based PSCCH and the number of symbols constituting the S-TTI based PSSCH are the same.

In FIG. 5(b), it is S-PSCCH_L<S-PSSCH_L. That is, in the time domain, the number of symbols constituting the S-TTI based PSSCH is larger than the number of symbols constituting the S-TTI based PSCCH.

In FIG. 5(c), it is S S-PSCCH_L>S-PSSCH_L. That is, in the time domain, the number of symbols constituting the S-TTI based PSSCH is smaller than the number of symbols constituting the S-TTI based PSCCH.

<Power Determination Method, Upon Transmission on a Single Carrier>

As shown in FIG. 5(a), in the case of S-PSCCH_L=S-PSSCH_L, the transmission power may be determined in the same manner as the existing 1 ms TTI-based operation.

For example, the transmission power may be determined as follows for the S-PSSCH.

In the sidelink transmission mode 3 (mode 3), PPSSCH for PSSCH transmission may be determined as the following equation.

[Equation 1]

$$P_{PSSCH} = 10\log_{10}\left(\frac{M_{PSSCH}}{M_{PSSCH} + 10^{\frac{3}{10}} \times M_{PSCCH}}\right) + \min\left\{P_{CMAX},\right. \quad [\text{dBm}]$$

$$\left. 10\log_{10}\left(M_{PSSCH} + 10^{\frac{3}{10}} \times M_{PSCCH}\right) + P_{O\_PSSCH,3} + \alpha_{PSSCH,3} \cdot PL\right\}$$

In Equation 1, $P_{CMAX}$ is a configured maximum UE output power. $M_{PSSCH}$ is a band of PSSCH resource allocation expressed in number of resource blocks. PL means a path loss. $P_{O\_PSSCH,3}$, $\alpha_{PSSCH,3}$ is a value provided by an upper layer parameter associated with a corresponding PSSCH resource configuration.

In the case of sidelink transmission mode 4 (mode 4), PPSSCH for PSSCH transmission may be determined as follows.

[Equation 2]

$$P_{PSSCH} = 10\log_{10}\left(\frac{M_{PSSCH}}{M_{PSSCH} + 10^{\frac{3}{10}} \times M_{PSCCH}}\right) + A \quad [\text{dBm}]$$

In the case of sidelink transmission mode 4 (mode 4), PPSSCH for PSSCH transmission may be determined as the following equation. The PPSSCH is two.

The 'A' may be given by Equation 3 or 4 below.

[Equation 3]

$$A = \min\left\{P_{CMAX}, P_{MAX\_CBR},\right.$$

$$\left. 10\log_{10}\left(M_{PSSCH} + 10^{\frac{3}{10}} \times M_{PSCCH}\right) + P_{O\_PSSCH,4} + \alpha_{PSSCH,4} \cdot PL\right\}$$

[Equation 4]

$$A = \min\left\{P_{CMAX},\right.$$

$$\left. 10\log_{10}\left(M_{PSSCH} + 10^{\frac{3}{10}} \times M_{PSCCH}\right) + P_{O\_PSSCH,4} + \alpha_{PSSCH,4} \cdot PL\right\}$$

When the upper layer parameter 'maxTxpower' is configured, equation 3 may be used, otherwise equation 4 may be used. PO_PSSCH,4, αPSSCH,4 is a value provided by upper layer parameters associated with the corresponding PSSCH resource configuration. PMAX_CBR may be configured to the upper layer parameter 'maxTxpower' value on the basis of the priority level of the PSCCH and the CBR range.

Figure 6:
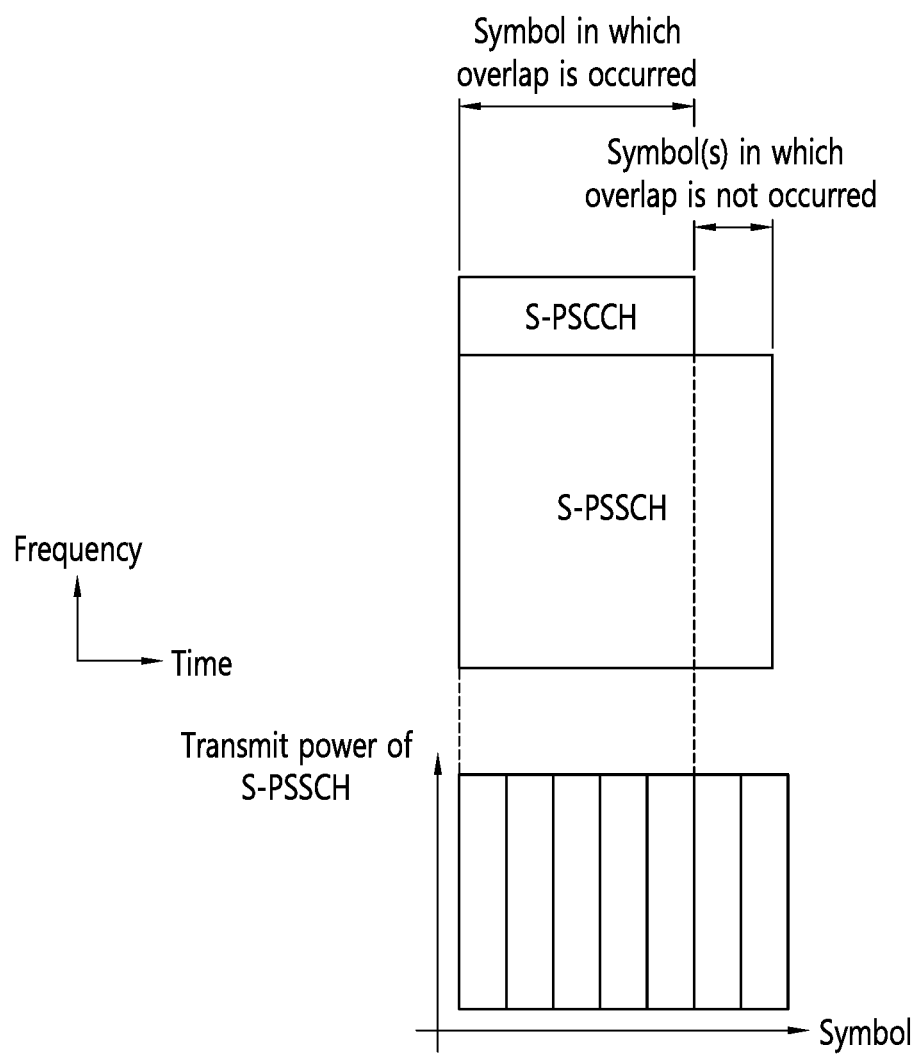
FIG. 6 shows a transmission power determination method according to an embodiment of the present disclosure.

FIG. 6 shows a transmission power determination method according to an embodiment of the present disclosure.

Referring to FIG. 6, when S-PSCCH_L<S-PSSCH_L (the situation in FIG. 5B). That is, on the time axis, a partial overlap occurs in the time domain between S-PSCCH transmission and S-PSSCH transmission. In other words, some of the symbols used for S-PSSCH transmission overlap with the symbols used for S-PSCCH transmission in the time domain. In this case, it is not desirable to increase the transmit power in symbols of the S-PSSCH where no overlap occurs. In this case, an additional power transition period (POWER TRANSIENT PERIOD) occurs and the transmission power between symbols in a single S-TTI is changed and it may adversely affect the sensing performance. In other words, the transmission power in the symbol of the overlapped S-PSSCH may be maintained the same also in the symbols (regions) of the S-PSSCH in which the remaining overlap has not occurred.

Next, in the situation as shown in FIG. 5(c), that is, in the case of S-PSCCH_L>S-PSSCH_L, the transmission power of the S-PSCCH in the overlapping symbol may be maintained constantly even in the S-PSCCH in the non-overlapping symbol.

A transmission power determination method in transmitting signals on multiple carriers will be now described.

The priority rule of power allocation (POWER ALLOCATION) may be defined as one or a combination of the following rules.

The representative S-TTI length related to V2X transmission on a specific carrier may be assumed to be a maximum value (or minimum value) among S-PSCCH_L and S-PSSCH_L.

(Rule #A) The transmit power with high priority may be allocated to relatively short (or long) length S-TTI based transmission. For example, using a small number of symbols and at the same time reducing transmission power can cause a lot of performance degradation, so that transmission power can be allocated at high priority to relatively short length S-TTI based transmissions.

(Rule #B) The transmit power with high priority may be allocated to the ProSe priority per packet (PPPP) based V2X transmission (e.g., purposes for determining prioritization between V2X transmission(s)) higher (or lower) and/or (simultaneously) relatively higher (or lower) thresholds (e.g., purposes for determining prioritization between V2X/uplink transmission(s)). For example, by comparing the PPPP value (first PPPP value) of the V2X message to be transmitted on the first carrier with the PPPP value (second PPPP value) of the V2X message to be transmitted on the second carrier, when the first PPPP value is higher and the rest of the other conditions are the same, then it is to firstly allocate transmit power to the first carrier.

(Rule #C) For a pre-configured (/signaled) specific signal/channel transmission (e.g., SLSS/PSBCH), transmit power may be allocated at an exceptionally high (or low) priority. For example, when the location of the SLSS/PSBCH resource is differently configured (/signaled) between the carriers, the transmission power is preferentially allocated at the corresponding time point of the carrier including the resource.

(Rule #D) The transmit power may be allocated at a high priority to transmission on a carrier in which a relatively high (or low) CBR is measured, or on a carrier with less (or more) resources left than CR_LIMIT.

(Example) Rule (B) is applied by default, but when the priority is the same between V2X transmission(s), and then the Rule (A) (and/or Rule (D) and/or Rule (C)) may be applied for TIE-BREAKER purposes.

Figure 7:
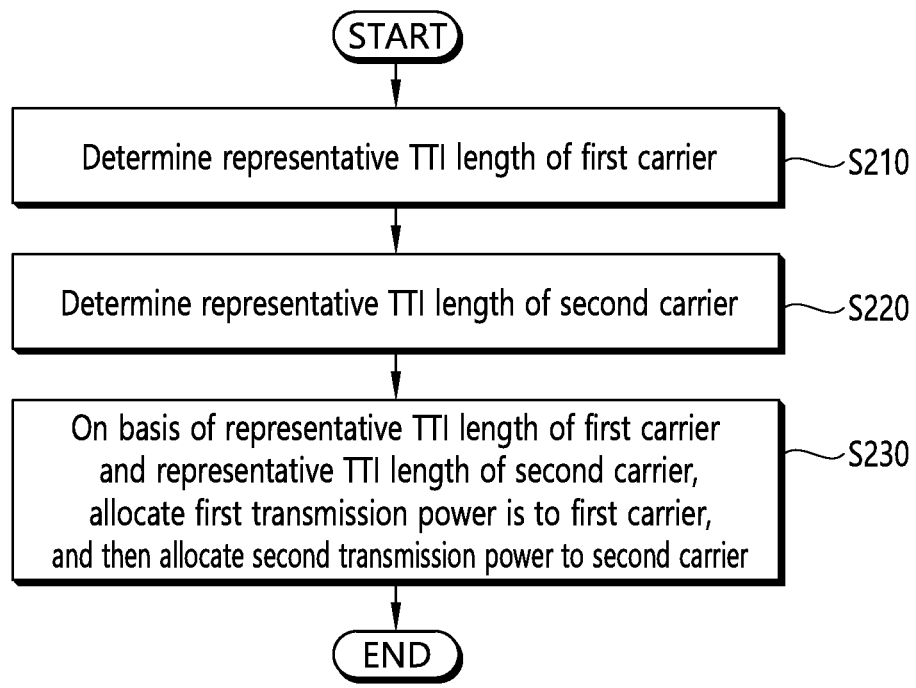
FIG. 7 shows a transmission power allocation method of a terminal according to an embodiment of the present disclosure.

FIG. 7 shows a transmission power allocation method of a terminal according to an embodiment of the present disclosure.

Referring to FIG. 7, the terminal may be configured for a first carrier and a second carrier for V2X signal transmission.

In this case, the terminal determines the representative TTI length of the first carrier (S210), and after determining the representative TTI length of the second carrier (S220), then on the basis of the representative TTI length of the first carrier and the representative TTI length of the second carrier, a first transmission power is allocated to the first carrier, and then a second transmission power may be allocated to the second carrier (S230).

In this case, for example, the representative TTI length of the first carrier may be shorter than the representative TTI length of the second carrier. In this case, the first transmission power may be greater value than the second transmission power.

When the number of symbols to which the PSCCH is transmitted on the first carrier is n (n is a natural number) and the number of symbols to which the PSSCH is transmitted is m (m is a natural number), the representative TTI length of the first carrier may be determined as the maximum value or the minimum value among n and m.

The first transmission power and the second transmission power may be allocated on the basis of the representative TTI length of the first carrier and the representative TTI length of the second carrier, priority per packet, or PPPP for each packet of signals transmitted in the first carrier and the second carrier, respectively and channel busy ratio (CBR).

When the number of symbols to which the PSCCH is transmitted in the first carrier is n (n is a natural number), the number of symbols to which the PSSCH is transmitted is m (m is a natural number), and m is greater than the number n, the PSSCH may be transmitted at a constant transmit power. This has been described with reference to FIG. 6. The PSCCH and the PSSCH may be frequency division multiplexed (FDM).

Alternatively, when the number of symbols on which the PSCCH is transmitted in the first carrier is n (n is a natural number), the number of symbols on which the PSSCH is transmitted is m (m is a natural number), and m is larger than n, the transmit power of the PSSCH transmitted in the n symbols and the transmit power of the PSSCH transmitted in the m-n symbols may be different from each other. In this case, information indicating a difference or ratio between the transmission power of the PSSCH transmitted in the n symbols and the transmission power of the PSSCH transmitted in the m-n symbols on the PSCCH may be provided. This may be referred to FIG. 9 and the description below.

Figure 8:
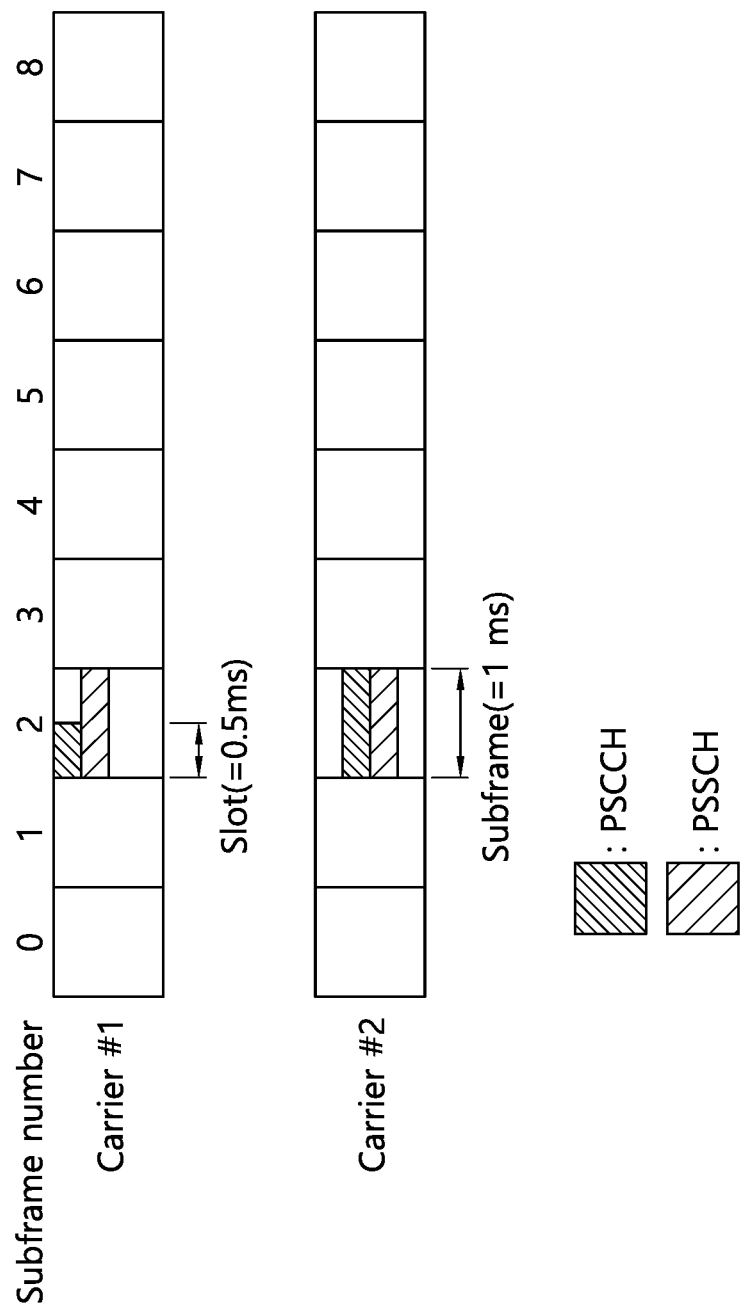
FIG. 8 shows an example of applying the method of FIG. 7.

FIG. 8 shows an example of applying the method of FIG. 7.

Referring to FIG. 8, in the first carrier, the PSCCH is transmitted in a slot (0.5 ms) unit. That is, the PSCCH is transmitted on the basis of the S-TTI. On the other hand, the PSSCH is transmitted in units of subframes.

In this case, the value of the representative TTI is determined in the first carrier, and may be determined as 0.5 ms or 1 ms. For example, assume that the value of the representative TTI is determined to be 0.5 ms in the first carrier.

In the second carrier, both PSCCH/PSSCH are transmitted in subframe units. In this case, the value of the representative TTI in the second carrier may be determined to be 1 ms.

The terminal may allocate a first transmission power to the first carrier and allocate a second transmission power to the second carrier, on the basis of the representative TTI length of the first carrier and the representative TTI length of the second carrier. For example, when transmission power is allocated to a relatively short TTI based transmission at high priority, the first transmission power may be allocated to the first carrier first, and then the second transmission power may be allocated to the second carrier. On the contrary, when the transmission power is allocated to the relatively long TTI based transmission with high priority, the second transmission power may be allocated to the second carrier first, and then the first transmission power may be allocated to the first carrier.

In FIGS. 7 and 8, an example in which a priority of allocating transmission powers in multiple carriers is determined on the basis of a representative TTI length, but it is not limited. That is, the priority for allocating the transmission power in multiple carriers may be determined in consideration of the representative TTI length of the carrier, the ProSe priority per packet (PPPP) of the message transmitted on the carrier, and the CBR. The PPPP may be called PPP as a priority per packet.

In the above-described manner, after the transmission power for each carrier is determined in multiple carriers, within the transmission power allocated for the corresponding carrier, the UE may transmit the PSCCH/PSSCH by the method of FIG. 6 described above.

Open loop power control parameters (and/or maximum transmit power) for each S-TTI length (e.g. P_O, ALPHA, P_MAX, etc.) may be configured (/signaled) independent of the existing 1 ms based legacy transmission (LEGACY TX).

In addition, a parameter of a physical layer/CR_LIMIT value or the like associated with the CBR/PPPP for each S-TTI length may be independently configured (/signaled).

A minimum guaranteed power value may be configured (/signaled) for each S-TTI length.

In a situation where a high priority, V2X transmission resource reservation is made first in terms of power allocation, on a specific carrier #A, when a low priority, V2X transmission resource reservation should be additionally performed on another carrier #B, it is possible to preferentially use the previously reserved resources on the carrier #A, the resources of carrier #B that do not overlap (all or in part) in the time domain.

Figure 9:
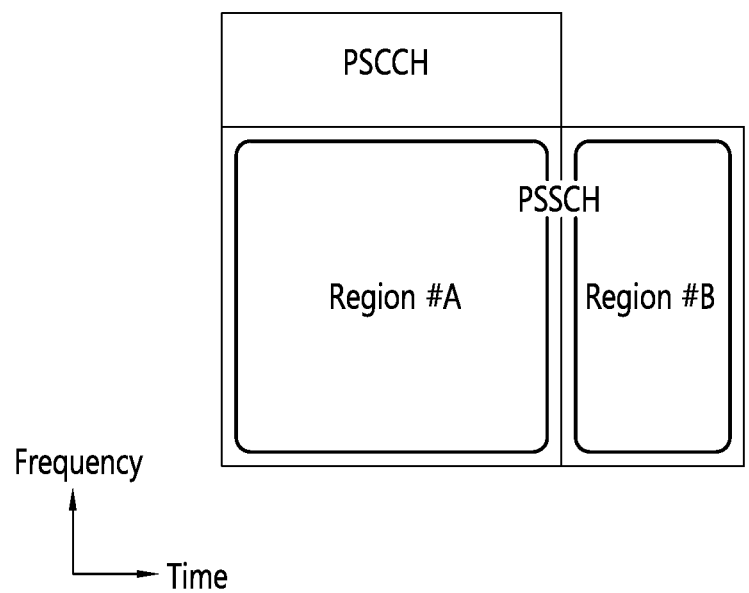
FIG. 9 shows another example of allocating transmission power to the PSCCH and the PSSCH.

FIG. 9 shows another example of allocating transmission power to the PSCCH and the PSSCH.

Referring to FIG. 9, transmission power between symbols during PSSCH transmission may vary. For example, the transmission power between the PSSCH region #A and the PSSCH region #B may be different. In this case, the following method may be considered for quadrature amplitude modulation (QAM) demodulation.

The base station or the network may inform "transmission power difference (/ratio)" information between the PSSCH region #A and the PSSCH region #B through the PSCCH and/or a pool configuration signal. The transmission power difference (/ratio) information may be useful especially when there is no demodulation reference signal (DM-RS) symbol transmission in one of the PSSCH regions #A/B. For example, when there is a DM-RS symbol transmission only on the region #A, the transmission power difference (/ratio) information may be about the DM-RS symbol in the region #A and data symbol in the region #B.

Additionally, the network may signal the "maximum allowable transmit power difference (/ratio) between PSSCH region #A and PSSCH region #B" for a specific pool, thereby limiting the impact on sensing performance and the like.

The network may fix the PSCCH length transmitted on a specific pool through predefined signaling, and/or allow a plurality of PSCCH lengths (transmissions), and allow the UE to blind decode (BLIND DECODING).

The network may assign (or adjust) the number of PSCCH (/PSSCH) blind decoding of a UE to be performed on multiple pools related to multiple carriers in a carrier (/pool)-specific manner through predefined signaling.

It is obvious that examples of the proposed scheme described above may also be regarded as a kind of proposed scheme, since they may be included as one of the implementation methods of the present disclosure. In addition, although the above-described proposal schemes may be independently implemented, some proposal schemes may be implemented in the form of combination (or merge).

As an example, the present disclosure has been described a proposal method on the basis of the 3GPP LTE system for convenience of description, the scope of the system to which the proposed method is applied can be extended to other systems in addition to the 3GPP LTE system. As an example, the proposed schemes of the present disclosure can be extended and applied for D2D communication. Here, the D2D communication means that the terminal communicates directly with another terminal using a wireless channel Here, for example, the terminal means a terminal of a user, but network equipment such as a base station may also be regarded as a kind of terminal when transmitting/receiving a signal according to a communication method between the terminals.

In addition, as an example, the proposed schemes of the present disclosure may be limitedly applied only to mode 3 V2X operation (and/or mode 4 V2X operation).

In addition, as an example, the proposed schemes of the present disclosure may be limitedly applied only to (specific) V2X channel (/signal) transmissions that are pre-configured (/signaled), e.g., PSSCH (and/or (associated) PSCCH and/or PSBCH).

In addition, as an example, the proposed schemes of the present disclosure may be limitedly applied only to when the PSSCH and the (associated) PSCCH are transmitted adjacent to (and/or non-adjacent) in the frequency domain (and/or when pre-configured (/signaled) MCS (and/or coding rate and/or resource block) (value (/range)) based transmission is performed).

In addition, as an example, the proposed schemes of the present disclosure may be limitedly applied only to between mode #3 (and/or mode #4) V2X carrier (and/or (mode #4 (/3)) sidelink (/uplink) SPS (and/or sidelink (/uplink) dynamic scheduling) carrier).

In addition, as an example, the proposed schemes of the present disclosure may be (limitedly) applied only to when synchronization signal (transmission (and/or reception)) resource location and/or the number of the resource (and/or V2X resource pool related subframe location and/or the number of subframes (and/or the sub-channel size and/or the number of sub-channels) is the same (and/or (partially) different).

Figure 10:
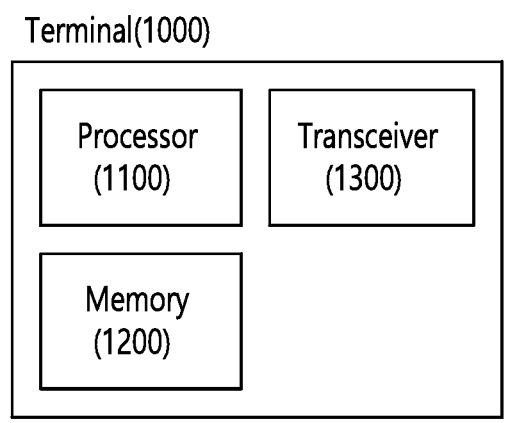
FIG. 10 is a block diagram illustrating an apparatus in which an embodiment of the present disclosure is implemented.

FIG. 10 is a block diagram illustrating an apparatus in which an embodiment of the present disclosure is implemented.

Referring to FIG. 10, the apparatus 1000 includes a processor 1100, a memory 1200, and a transceiver 1300. The processor 1100 implements the proposed functions, processes, and/or methods. The apparatus 1000 may be a terminal or a base station. The transceiver 1300 is connected to the processor 1100 to transmit and receive a radio signal. The memory 1200 may store information necessary for the operation of the processor 1100 and may also store a transmission/reception signal.

Figure 11:
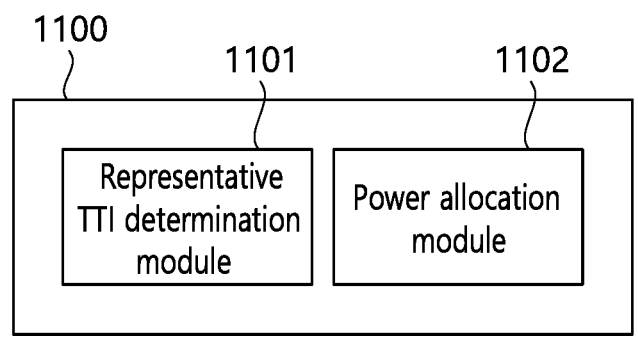
FIG. 11 shows an example of configuring the processor 1100.

FIG. 11 shows an example of configuring the processor 1100.

Referring to FIG. 11, the processor 1100 may include a representative TTI determination module 1101 for determining a representative TTI for each carrier and a power allocation module 1102 for determining transmission power allocated for each carrier.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

What is claimed is:

1. A method for transmitting a physical sidelink shared channel (PSSCH) in a wireless communication system, the method performed by a user equipment (UE) and comprising:

establishing a radio resource control (RRC) connection with a base station, wherein, after establishing the RRC connection, the UE is in an RRC connected state;

receiving, from the base station, information for a resource pool of a sidelink;

performing a measurement of a channel busy ratio (CBR) on the resource pool, wherein the CBR is defined as a proportion of sub-channels in the resource pool whose sidelink received signal strength indicator (S-RSSI) measured by the UE exceed a threshold sensed over a CBR measurement window; and allocating a first transmit power to a first carrier and a second transmit power to a second carrier based on:
a length of a representative transmission time interval (TTI) of the first carrier;
a length of a representative TTI of a second carrier,
a priority of a first packet of signals to be transmitted via the first carrier,
a priority of a second packet of signals to be transmitted via the second carrier, and
a CBR of the first and second packets of signals transmitted on the first carrier and the second carrier, respectively, wherein based on the length of the representative TTI of the first carrier being shorter than the representative TTI of the second carrier, the first transmit power is a greater value than the second transmit power, wherein, for transmitting the PSSCH, the UE receives information for transmission power difference between a PSSCH region #A and a PSSCH region #B, wherein the information for the transmission power difference is information about demodulation reference signal (DM-RS) symbol in the PSSCH region #A and data symbol in the PSSCH region #B, and wherein the DM-RS symbol is transmitted on the PSSCH region #A and not transmitted on the PSSCH region #B.

2. The method of claim 1, wherein when the number of symbols to which a physical sidelink control channel (PSCCH) is transmitted is n (n is a natural number) and the number of symbols to which a physical sidelink shared channel (PSSCH) is transmitted is m (m is a natural number) on the first carrier, the length of the representative TTI of the first carrier is determined as the maximum value among n and m.

3. The method of claim 1, wherein when the number of symbols to which a physical sidelink control channel (PSCCH) is transmitted is n (n is a natural number) and the number of symbols to which a physical sidelink shared channel (PSSCH) is transmitted is m (m is a natural number) on the first carrier, the length of the representative TTI of the first carrier is determined as the minimum value among n and m.

4. The method of claim 1, wherein when the number of symbols to which a physical sidelink control channel (PSCCH) is transmitted is n (n is a natural number), the number of symbols to which a physical sidelink shared channel (PSSCH) is transmitted is m (m is a natural number) on the first carrier and m is greater than n, the PSSCH is transmitted at a constant transmit power in the m symbols.

5. The method of claim 4, wherein the PSCCH and the PSSCH are frequency division multiplexed (FDM).

6. The method of claim 1, wherein when the number of symbols to which a physical sidelink control channel (PSCCH) is transmitted is n (n is a natural number), the number of symbols to which a physical sidelink shared channel (PSSCH) is transmitted is m (m is a natural number) on the first carrier and m is greater than n, the transmit power of the PSSCH transmitted in the n symbols and the transmit power of the PSSCH transmitted in the m-n symbols are different from each other.

7. The method of claim 6, wherein information indicating a difference or ratio between the transmission power of the PSSCH transmitted in the n symbols and the transmission power of the PSSCH transmitted in the m-n symbols on the PSCCH is received.

8. The method of claim 1, wherein the first carrier and the second carrier is included in the multiple carriers.

9. A user equipment (UE), comprising:
a transceiver configured to transmit and receive radio signal; and
a processor operably coupled to the transceiver, wherein the processor configured to:
establish a radio resource control (RRC) connection with a base station,
wherein, after establishing the RRC connection, the UE is in an RRC connected state;
receive, from the base station, information for a resource pool of a sidelink;
perform a measurement of a channel busy ratio (CBR) on the resource pool,
wherein the CBR is defined as a proportion of sub-channels in the resource pool whose sidelink received signal strength indicator (S-RSSI) measured by the UE exceed a threshold sensed over a CBR measurement window; and
allocate a first transmit power to a first carrier and a second transmit power to a second carrier based on:
a length of a representative transmission time interval (TTI) of the first carrier,
a length of a representative TTI of a second carrier,
a priority of a first packet of signals to be transmitted via the first carrier,
a priority of a second packet of signals to be transmitted via the second carrier, and a CBR of the first and second packets of signals transmitted on the first carrier and the second carrier, respectively, wherein based on the length of the representative TTI of the first carrier being shorter than the representative TTI of the second carrier, the first transmit power is a greater value than the second transmit power, wherein, for transmitting the PSSCH, the UE receives information for transmission power difference between a PSSCH region #A and a PSSCH region #B, wherein the information for the transmission power difference is information about demodulation reference signal (DM-RS) symbol in the PSSCH region #A and data symbol in the PSSCH region #B, and wherein the DM-RS symbol is transmitted on the PSSCH region #A and not transmitted on the PSSCH region #B.

* * * * *